April 12, 1966  J. W. LEONARD III  3,245,538
HEATING-UNIT ARRANGEMENT FOR VACUUM-DISC FILTER
Filed Dec. 31, 1962
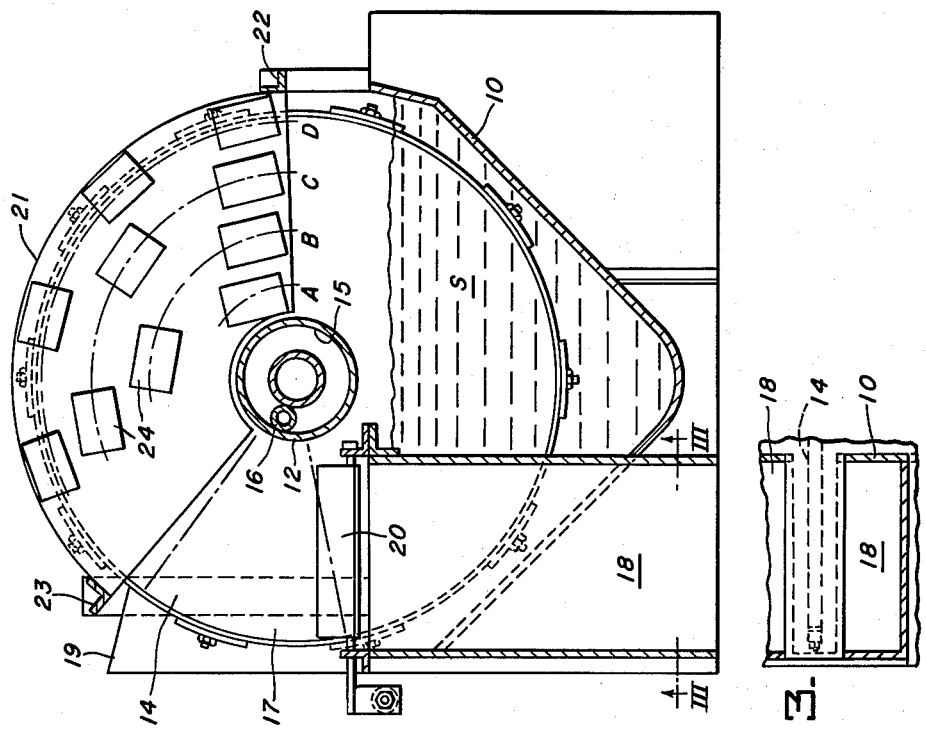
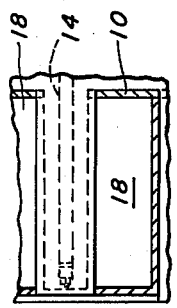
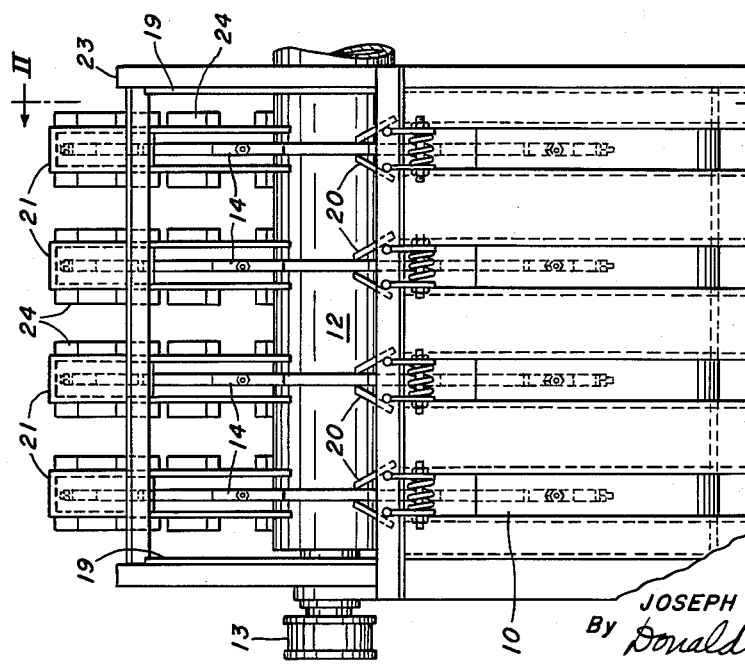
INVENTOR.
JOSEPH W. LEONARD III
By Donald G. Dalton
Attorney 3,245,538
HEATING-UNIT ARRANGEMENT FOR VACUUM-DISC FILTER Joseph W. Leonard III, Morgantown, W. Va., assignor to United States Steel Corporation, a corporation of New Jersey
Filed Dec. 31, 1962, Ser. No. 248,527
1 Claim. (Cl. 210—179)

This invention relates to an improved heating-unit arrangement for a vacuum-disc filter used in dewatering particulate material, such as coal or ore.

A conventional vacuum-disc filter includes a rectangular tank, a hollow motor-driven horizontal shaft extending the length of the tank, and a plurality of hollow filter discs carried by the shaft. A slurry of water and particulate material feeds into the tank. The shaft bore contains a vacuum manifold and a blowpipe which communicate with different portions of the space within each disc. As the discs rotate, they dip into the slurry and, under the influence of the vacuum, pick up a cake of particles. The cake partially dries as it leaves the tank. Ultimately air from the blowpipe blows the dried cake from the disc into a suitable receiver. Filters of this construction are available commercially. One supplier is the Eimco Corporation, of Salt Lake City, Utah, who describe such a filter in a printed publication entitled, "Eimco Agidisc Filters," Bulletin F2032. It is known to equip filters of this type with hoods which cover a portion of each disc outside the tank and to place heating units on the hoods as a means for expediting drying of the particles. However, previous arrangements of this type with which I am familiar have a disadvantage that it is difficult to heat all particles uniformly.

An object of my invention is to provide an improved arrangement of heating units in which the units are placed where they heat the particles uniformly on all portions of a disc.

A further object is to provide an improved arrangement which applies the same heat to all portions of a filter disc by exposing faster moving portions of the disc to a proportionately larger number of heating units.

In the drawing:

FIGURE 1 is a side elevational view of a vacuum disc filter equipped with heating units arranged according to my invention;

FIGURE 2 is a vertical section on line II—II of FIGURE 1; and

FIGURE 3 is a horizontal section on line III—III of FIGURE 2.

The drawing shows a filter which comprises a tank 10 rectangular in plan, a hollow shaft 12 journaled above said tank, and a drive pulley 13 and a plurality of hollow filter discs 14 mounted on said shaft. Each disc includes a framework and spaced-apart screens mounted on said framework (not shown in detail). The tank contains a slurry S of particulate solids and water introduced from a conveyor or the like (not shown). The shaft turns counterclockwise, as viewed in FIGURE 2, and its bore forms a vacuum manifold 15 and also contains a blowpipe 16. The space within each disc is subject to a partial vacuum, except in a sector 17 of about 45° located just before the disc re-enters the slurry, where it is subject to positive pressure from the blowpipe. The vacuum draws particles from the slurry to the outer surface of each side of each disc and tends to dry these particles as the disc emerges from the slurry. In sector 17 pressure forces particles from the disc into chutes 18, which extend downwardly through the tank between discs (FIGURE 3). The passages through which manifold 15 and blowpipe 16 communicate with the interior of discs 14 are conventional and not involved in my invention; hence in the interest of simplicity I have not shown them. The filter may also include splash guards 19 at opposite ends and mechanical scrapers 20 which engage the faces of the discs to assist in removing particles and directing them into the chutes. Since a filter of this construction is conventional, no more detailed description is deemed necessary.

As also known in the art, respective hoods 21 cover the sectors of each disc 14 where the particles dry. These sectors extend from a plane spaced above the normal level of the slurry S approximately to the beginning of the "blowoff" sectors 17. The hoods are mounted on angle iron frames 22 and 23 fixed to opposite sides of tank 10. The outer faces of the hoods carry heating units 24 on each side, per se of conventional construction. One suitable form of heating unit is that shown in Schwank Patent No. 2,775,294, which burns a gaseous fuel, but it is obvious many equivalents are possible, such as electric heaters or steam outlets.

My invention concerns the specific arrangement of the heating units 24. I place the heating units in closely adjacent arcuate rows A, B, C and D. The number of rows (four in the illustration) is sufficient to present an effectively solid front of heating units at the lower edge of each side of each hood interrupted only by negligible spaces between units in adjacent rows. The innermost row A has only a single heating unit. In each succeeding row, the number of units increases by one. The number of heating units in the outermost row equals the number of rows. As each disc rotates, particles on its surface travel through a linear distance and at a linear velocity proportional to their distance from the axis of rotation. For example, a particle near the circumference of a disc travels about twice as far and at twice the velocity of a particle halfway between the axis and the circumference. My arrangement of heating units places twice the number of units over particles near the circumference as over particles in the halfway position. Each particle is exposed to a heating unit for approximately the same length of time. Hence the particles are heated almost uniformly on all portions of each disc, even though I operate all the heaters at the same intensity.

While I have shown and described only a single embodiment of my invention, it is apparent that modifications may arise. Therefore, I do not wish to be limited to the disclosure set forth but only by the scope of the appended claim.

I claim:

In a vacuum disc filter which includes a tank, a shaft, means journaling said shaft above said tank on a horizontal axis, and a plurality of filter discs fixed to said shaft to rotate therewith and extending into said tank, each of said discs having a hood enclosing the upper portion thereof, said hoods being of sector shape and supported on said tank and having vertical side faces, the combination therewith of means for heating the portions of said discs which are enclosed by said hoods, said means comprising at least four arcuate rows of gas heating units mounted on the outside of each side face of each of said hoods, said rows being concentric with said axis, the number of rows being sufficient to occupy substantially the lower edge of each side face, there being only a single heating unit in the row nearest said axis, the number of heating units in each succeeding row increasing by one, the number of heating units in the row farthest from said axis being equal to the number of rows to expose all portions of each disc to a heating unit for substantially the same length of time as said shaft rotates, each of said heating units providing heat of the same intensity, whereby the discs are heated uniformly.

References Cited by the Examiner

UNITED STATES PATENTS

| 1,336,444 | 4/1920 | Salisbury | 210—68 |
| 1,704,796 | 3/1929 | Honigmann | 159—11 |
| 1,874,972 | 8/1932 | Hall | 210—82 |
| 2,775,294 | 12/1956 | Schwank | 158—116 |

REUBEN FRIEDMAN, *Primary Examiner.*